US007846531B2

(12) United States Patent
Basler et al.

(10) Patent No.: US 7,846,531 B2
(45) Date of Patent: Dec. 7, 2010

(54) PADDED PAPER SHEET

(75) Inventors: Michel Basler, Issenheim (FR); Sébastien Jeannot, Colmar (FR); Pierre Laurent, Turckheim (FR); Rémy Ruppel, Durrenentzen (FR)

(73) Assignee: Georgia-Pacific France, Kunheim (FR)

( * ) Notice: Subject to any disclaimer, the term of this patent is extended or adjusted under 35 U.S.C. 154(b) by 168 days.

(21) Appl. No.: 10/275,487

(22) PCT Filed: Mar. 4, 2002

(86) PCT No.: PCT/FR02/00770

§ 371 (c)(1),
(2), (4) Date: Nov. 26, 2002

(87) PCT Pub. No.: WO02/072956

PCT Pub. Date: Sep. 19, 2002

(65) Prior Publication Data

US 2004/0023003 A1 Feb. 5, 2004

(30) Foreign Application Priority Data

Mar. 9, 2001 (EP) ................................. 01400629

(51) Int. Cl.
*B32B 3/00* (2006.01)

(52) U.S. Cl. ...................................... 428/154; 156/163

(58) Field of Classification Search ................. 428/154; 156/163

See application file for complete search history.

(56) References Cited

U.S. PATENT DOCUMENTS

| | | | | |
|---|---|---|---|---|
| 3,650,882 | A | 3/1972 | Thomas | |
| 3,672,950 | A * | 6/1972 | Murphy et al. | 428/154 |
| 3,673,060 | A | 6/1972 | Murphy et al. | |
| 3,953,638 | A * | 4/1976 | Kemp | 428/154 |
| 4,469,735 | A | 9/1984 | Trokhan | |
| 4,487,796 | A * | 12/1984 | Lloyd et al. | 428/154 |
| 5,436,057 | A | 7/1995 | Schulz | |
| 6,048,603 | A * | 4/2000 | Ruppel et al. | 428/195.1 |
| 6,106,928 | A * | 8/2000 | Laurent et al. | 428/152 |
| 6,136,413 | A * | 10/2000 | Le Port et al. | 428/154 |
| 6,309,731 | B1 * | 10/2001 | Takeuchi et al. | 428/154 |
| 6,423,397 | B1 * | 7/2002 | Roussel | 428/156 |
| 6,723,203 | B2 * | 4/2004 | Roussel et al. | 162/111 |
| 2004/0121124 | A1 * | 6/2004 | Basler et al. | 428/154 |

FOREIGN PATENT DOCUMENTS

| | | |
|---|---|---|
| FR | 2 105 116 | 4/1972 |
| WO | WO 9955967 A1 * | 11/1999 |

* cited by examiner

*Primary Examiner*—William P Watkins, III
(74) *Attorney, Agent, or Firm*—Breiner & Breiner, L.L.C.

(57) ABSTRACT

This invention relates to a sheet of paper made up of at least two plies of creped tissue paper, an upper ply and a lower ply, each of a surface measure ranging from 10 to 40 g/m$^2$, the upper ply being embossed and provided with first protuberances. It is characterized in that such first protuberances are divided into rows which between them delimit cells of an area ranging from 1 to 20 cm$^2$, the upper ply being longer in the direction of advance than the lower ply by at least 0.6% and joined to it by the apex of the first protuberances so that cushions are formed inside the cells.

9 Claims, 1 Drawing Sheet

PADDED PAPER SHEET

The invention relates to a sheet of paper made up of at least two plies of cellulose cotton forming cushions.

The field of the invention is that of paper for sanitary or domestic use. It comprises in particular absorbent paper products whose shape, composition, and structure are determined by their application. Mention can thus be made, as nonrestrictive examples, of toilet paper, handkerchiefs, makeup removal facial tissues, table napkins, tablecloths, kitchen wipes, industrial wiping rags, etc.

Toilet paper, for example, is produced in the form of precut lengths in a continuous strip rolled around a hard paper core. The lengths can also be produced individually and be interlocked. The sheet can be single, but more often is made up of two or more thicknesses, also called plies, of tissue paper. The plies in a sheet can be simply juxtaposed, being free from each other, but more often they are embossed and connected to each other by an adhesive or connected mechanically by roll knurling.

Tissue paper is a paper of low surface measure, 10 to 40 $g/m^2$, made up essentially or exclusively of paper fibers and optionally comprising one or more additives to enhance one or another characteristic. Depending on the applications, emphasis may be placed on one or another of its properties so that it exhibits more softness, absorption, strength, or a more pronounced textile aspect to render it more attractive. For example, incorporation of resins serves to enhance tear resistance when the sheet is wet.

The tissue paper may also be creped, that is, may comprise undulations which impart to it a certain capacity for elongation in the direction of advance. Creping can be achieved, for example, at the time of drying the sheet. The latter is applied while still wet to a heated cylinder at a temperature high enough to extract the wetness. The sheet is released by means of a blade forming a stripper positioned between the sheet and the surface of the cylinder. This operation, when suitably carried out, results in the formation of corrugations positioned perpendicular to the direction of advance of the sheet. The creping of a sheet is characterized by the number of crests in the direction of advance per unit length.

U.S. Pat. No. 3,673,060 discloses a product, a table napkin, for example, made up of two plies of creped cellulose cotton connected to each other by an adhesive. The latter is distributed in accordance with a pattern made up of surface points near each other and leaving substantial parts of the two plies unconnected. Only 4% to 8% of the surface is connected and the two plies whose creping lines are parallel, are not stretched in the same manner. This difference in tension is obtained by stretching the two plies differently before they are joined to each other along the pattern in question. Such tension control makes it possible for one of the plies to contract more than the other after the adhesive has set. There is a resulting tendency toward separation of the unconnected plies between areas with adhesive.

The Patent teaches application of adhesive on one ply by means of a suitably engraved applicator roll. The second ply is then positioned on the first, after which the two plies are drawn between two calendering cylinders one of which is engraved and in phase with the applicator roller. Lastly, the sheet is drawn between two engraved steel cylinders, to be embossed there along the edges of what will be the napkin after being cut out. Hence, this process appears to be an application limited to manufacture of a product such as a napkin with embossed edging.

In addition, the recommended surface of the part not connected between two adjacent connected zones is of the order of 0.65 $cm^2$. It is relatively weak. In the example cited, the surface of the dotted connecting zones is of the order of 2 $mm^2$, with spacing of 4.75 mm. It is stated in the Patent that the sheet thus imitates the look and texture of a textile product. By preference, the picots are distributed evenly over the sheet.

French Patent No. 70 35063 describes a process for manufacturing a sheet with several thicknesses of a flexible material, of paper or plastic, in which an adhesive is imprinted on one of the plies along a pattern termed an open peripheral pattern representing lozenges or squares. The two plies are first embossed in a uniform pattern of protuberances and one of the two is placed under tension longitudinally so as to impart to the sheet a "quilted" look after it has been cut into napkins. It is noted that the lozenges are very wide; otherwise the glue deposited along continuous lines would undoubtedly create a relatively rigid product. Hence this Patent applies to products such as table napkins.

U.S. Pat. No. 3,650,882 describes a paper made up of three plies of tissue paper of which the center ply is extensible and elastic and the outer plies are embossed and less extensible. The plies are connected along zones spaced so as to leave the parts not connected to each other. In the wet state, the inner ply can thus expand and occupy the space of the unconnected parts. The Patent calls for connection of the center ply to the outer plies while the former is extended relative to the latter. When the stresses to which the sheet is subjected are relaxed, the center ply retracts and the other plies swell out in the unconnected zones. The connected zones and the unconnected parts appear to be of the same extent.

U.S. Pat. No. 4,469,735 describes a product with several plies of cellulose cotton having different elongation characteristics so as to permit formation of cavities and increase in their absorption volume when wet.

An object of this invention is creation of a product made up of at least two plies of creped tissue paper presenting an attractive appearance to the consumer, in particular an appearance which is similar to that of a textile product and is improved over that known in the art.

Hence the subject of the invention is a product made up of at least two plies, one upper and one lower ply, of creped tissue paper, each of a surface measure ranging from 10 to 40 $g/m^2$, of which the upper ply is embossed and comprises first protuberances on the face turned inward by the apexes of which the plies are connected. This product is characterized in that such first protuberances are divided into rows which between them delimit surface cells ranging from 1 to 20 $cm^2$, the upper ply being longer in the direction of advance than the lower ply of at least 0.6% and preferably between 0.6 to 2%, and being connected to the lower ply by the apexes of such first protuberances in such a way as to form cushions inside the cells.

Within the meaning of the patent, cushion is to be understood to mean a zone in which two plies are not connected to each other and which is delimited by rows of first protuberances forming a closed contour. The cushion is characterized by the fact that the upper ply seems to be detached from the lower ply and creates a cambered effect.

As a result of the invention, a product is obtained which exhibits a raised surface with cushions inside cells defined by rows of protuberances, a product whose appearance approaches that of textile products, quilted textiles in particular. It is an advantage that, when the product is in the form of a roll, the effect of cushions creating a quilted appearance is especially visible when the rolls are unwound.

Preferably, the cells have a ratio length/width between 1 and 5, preferably between 1 and 1.5.

Another characteristic is that such rows are made up of first protuberances spaced at a distance of less than 3 mm. As a matter of fact, cushions are not suitably formed when the spacing is greater. The undulations tend to extend in the transverse direction. The first protuberances making up the contours of the cushions are preferably truncated, with a circular or oval base. However, this base can also be polygonal in shape. It can also be very elongated in shape, leaving impressions along continuous or discontinuous lines.

In a preferred embodiment, the protuberances are truncated in shape, in particular circular in cross-section, and are spaced very closely along the rows. This spacing is preferably smaller than the cross-sectional diameter of a protuberance.

The rows can be rectilinear or wavy. In one particular embodiment they form a network whose cells are defined by their intersections. In particular such cells more or less form a lozenge and the sides of these cells are wavy. An example of such an embodiment is described in U.S. Pat. No. 5,436,057.

In another embodiment, the upper ply inside such cells is embossed in a pattern made up of second protuberances. The latter are truncated or exhibit an apex which is linear in form. The apex of the second protuberances is free, that is, is not glued or otherwise connected to the second ply.

The second ply may or may not be embossed.

This invention also relates to a process of making a product with at least two plies of creped tissue paper, of a surface measure ranging from 10 to 40 g/m$^2$.

The process claimed for the invention is characterized in that it comprises at least the following stages:

- a first strip of tissue paper is unrolled from a master spool and is embossed on an engraved embossing cylinder with a pattern made up of at least first protuberances forming rows which between them define closed cells,
- a second strip of tissue paper is unrolled from a master spool, and the second strip is applied to the first, and
- the two strips are joined by placing the two strips in contact by the apexes of the first protuberances so that, at the time of connection of the plies, the latter are differentiated at the time of connection of the plies in such a way that, at rest, the length of the plies differs by more than 0.6%, preferably by 0.6 to 2%. The strip obtained is then rolled under tension around a reel-up drum and the roll in question is cut into smaller rolls.

The two strips are differentiated from each other by the following characteristics, either alone or in combination: unrolling speed, tension in the direction of advance, the level or depth of embossing, and elasticity.

Further features and advantages of the invention will become apparent upon reading the following description of a non-restrictive exemplary embodiment with reference to the attached drawings, wherein.

Figure 1:
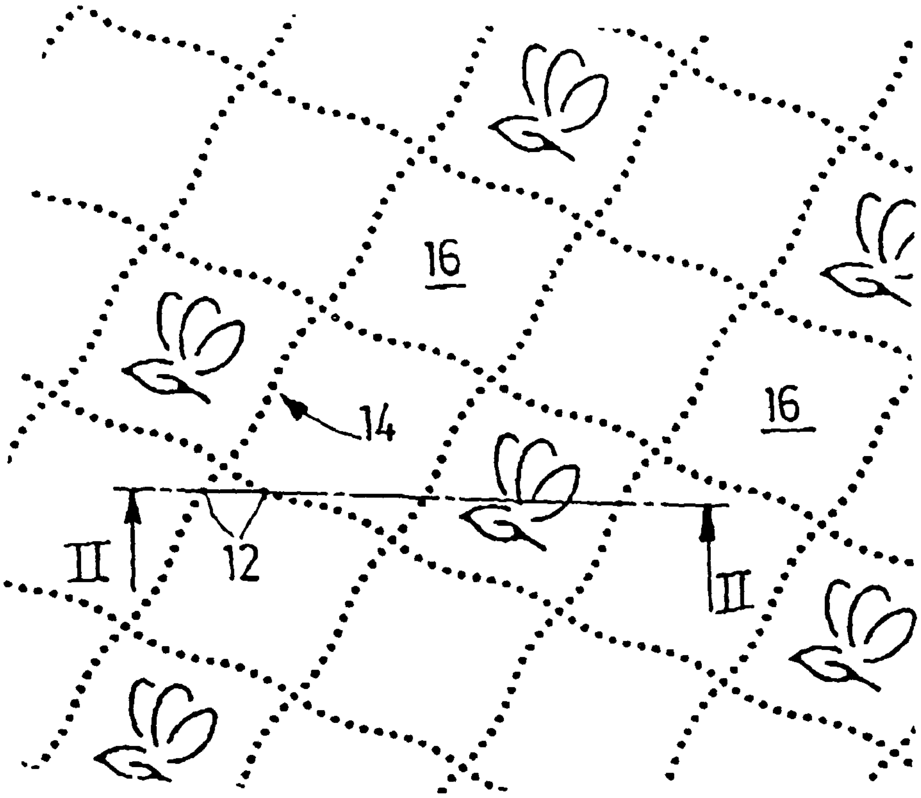
FIG. 1 shows a top view of a sheet as claimed for the invention.
Figure 2:
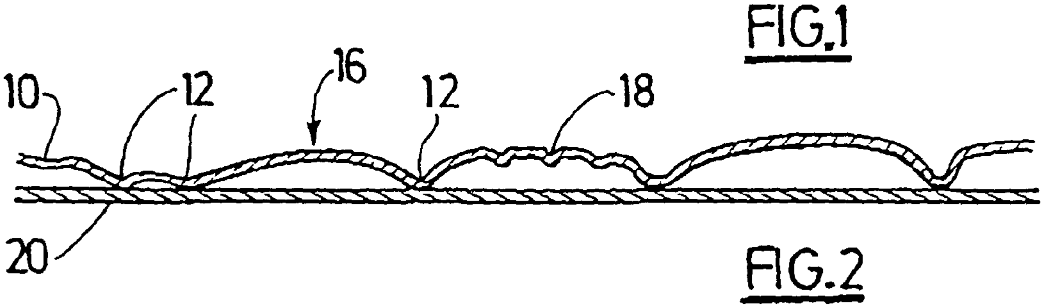
FIG. 2 is a sectional view along II-II in FIG. 1.

The sheet, shown in FIGS. 1 and 2, is made up of two plies of creped cellulose cotton. The cellulose cotton can be of the type obtained by a process of conventional wet pressing of the sheet, designated herein as CWP, or by a press comprising a stage of through air drying, TAD. The surface measure for each of the plies ranges from 10 to 40 g/m$^2$. Preferably a surface measure ranging from 15 to 24 g/m$^2$ is selected for an application such as toilet paper. A distinction is made between an upper ply 10 and a lower ply 20. The tissue paper is creped and has conventional waves, all oriented perpendicularly to the direction of advance of the machine. The number of creping lines ranges from 40 to 80 lines per cm.

Thus, the plies exhibit a degree of elongation at rupture of at least 25%. This degree is preferably no lower than 20%.

It is claimed for the invention that the upper ply has protuberances 12 on its surface facing the lower ply. These protuberances are formed by embossing and have cavities corresponding to them on the face turned toward the exterior of the sheet. In the plane of the sheet, they are substantially circular, oval, or polygonal in section. A film of adhesive applied between the apex of these first protuberances and the lower ply renders the two plies integral with each other.

The protuberances form rows 14. A row can be defined as a succession of protuberances consecutively forming the smallest spacings. In the embodiment shown, the rows are arranged in two directions substantially at an angle of 90° to each other so that they intersect, forming a network and regularly spaced cells 16.

In a preferred embodiment of the invention, the cells 16 are in the form of a parallelogram, preferably a lozenge. The ratio of the length, its largest dimension, to the width, the largest dimension measured transversely, does not exceed 5, and preferably does not exceed 1.5. The sides of the parallelogram are rectilinear or are wavy as shown in FIG. 1.

The upper ply is separated from the lower ply at the level of the cells. That is to say, its dimension in the direction of advance is greater than that of the lower ply. Analysis shows that the length of the upper ply should be at least 0.6% greater than that of the lower ply in order for the formation of cushions to be observed on the upper ply.

Another necessary condition is the distance separating two protuberances. Indeed, if the spacing exceeds a certain threshold, no cushions are formed. Waves do exist, because of the difference in length between the two plies, but they are irregular. It has been found that cushions are formed only if this distance between protuberances remains smaller than 3 mm.

Secondary embossing made up of second protuberances 18 can be provided inside the cells 16 as shown in the illustrations. These protuberances 18 have an embossed height smaller than that of the first protuberances 12. They do not form zones of connection between the upper ply and lower ply.

Figure 3:
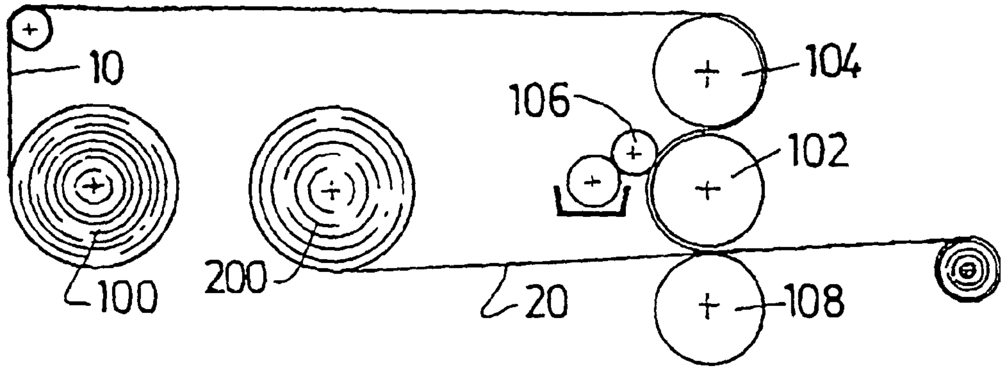
FIG. 3 is a schematic drawing of a device for producing a sheet as claimed for the invention.

A process for manufacture of a sheet claimed for the invention as illustrated in FIG. 3 is described in what follows. A first continuous strip of tissue paper 10 is unrolled from a master spool 100 mounted on a rotating base. This strip is drawn at a certain speed through an embossing assembly comprising a cylinder 102 with a rigid engraved surface and a cylinder 104 with an elastic surface such as of rubber. The engraving pattern of the rigid cylinder is, for example, that shown in FIG. 1, with first elements in relief or picots at a first engraving level for production of first protuberances and second elements in relief at a level lower than that of the first for production of second protuberances. Engravings of embossing cylinders at two levels are known to those skilled in the art.

After the strip has been embossed, there is applied to it a film of glue which is deposited on the surfaces in relief, that is, those of the embossing pattern, by a conventional applicator cylinder 106. The embossing pattern of the rigid cylinder corresponds to the first protuberances. It may also be made up of protuberances of different depths. In this instance the film of glue is deposited on the highest protuberance in relief only. The adhesive is a water-based glue, such as a polyvinyl glue common in the field of the invention.

In another embodiment the plies are joined mechanically or in any other manner known to the expert.

The second ply is then applied to the first ply by means of a joining cylinder 108. The second ply 20 comes from a master spool 200, from which it is unrolled at a specific speed. The pressure exerted by the joining cylinder ensures union of the plies with each other. The twofold sheet is then drawn while kept under tension toward a "log" production station. A "log" is an intermediate roll having the diameter of the product after the latter is finished and of a width equaling the width of the master spool. After it has been formed, the log is drawn to a cutting station where it is cut into sections. Lastly, the rolls obtained are moved to packing, conditioning, and storage stations.

It is claimed for the invention that the tension of one of the two strips of tissue paper relative to the other is adjusted upstream from the station at which the plies are joined. The purpose of such adjustment is to allow the lower ply to contract more than the other when the tensions are relaxed. A traction assembly (installed upstream from the station at which the two plies are joined) can be provided for this purpose. If, for example, the speed of the lower ply is slowed from 0.6% to 2% relative to the embosser speed, operation remains in the plastic deformation range and the level of tension of the ply is increased. When this tension is subsequently relaxed, the lower ply contracts in proportion and cushions are formed on the surface of the upper ply. In particular, when the lower ply is not embossed as shown in FIG. 3, difference in tension is then created between the lower ply and the upper ply by the embossing, which modifies the physical characteristics of the upper ply. Since the lower ply retains a higher elasticity value, this ply will contract more.

Products have been obtained by this process and differences in length of the two plies have been measured.

The measurement method consists of:

- measurement of the length of 10 consecutive sections on a roll,
- separation of the two plies, care being taken not to tear the paper at the points of adhesion and not to stretch it beyond its elastic deformation limit, and
- spreading the two plies out under a metal ruler and measurement of the difference in length in the direction of advance.

In order to calculate the relative percentage of difference (ER) in length between the plies, the fact that the outer ply is longer after rolling is taken into account.

The formula $$ER=(100/L1\times\{L2-L1\times(D1^2-Din^2)/[(D1+D2)\times 2\times N\times L]\}$$

is taken into account; the parameters are as defined below.

L1 is the length of 10 sections and D1 the initial diameter of the roll.

L2 is the lengthwise spacing measured between the two plies and D2 is the diameter after 10 sections have been removed.

Din is the diameter of the reel-up drum, N the initial number of sheets, and L the unit length of a section.

EXAMPLE 1

Two products have been manufactured with the same cellulose cotton whose characteristics are the following (measurements made of 2 plies):

Surface measure: 40.3 g/m$^2$.

Strength in direction of advance: 215 N/m. This is the value of the force necessary for tearing off a test piece in the direction of advance of the sheet reduced to one meter of width.

Strength in transverse direction: 75 N/m. Same as above, but the test piece has been cut off in a direction perpendicular to the preceding.

Rate of elongation at rupture: 16% (measured in the direction of advance).

The products were manufactured in accordance with the process described above. The upper ply was embossed with the pattern shown in FIG. 1; the lower ply was not embossed.

A first product was manufactured by applying a difference in tension between the plies, in such a way that the finished product exhibits a pronounced quilted effect. A second product was manufactured by reducing the deviation in tension between the two plies in such a way that the finished product does not exhibit a quilted effect.

Ten measurements were made for each of the products. The average relative deviations measured were the following:

First product: 1.12%

Second product: 0.23%

EXAMPLE 2

For the purpose of evaluating the preceding method of analysis and of determining whether the obtained result is significant, a third product was manufactured by embossing two plies together with the pattern shown in FIG. 1. The tissue paper exhibited the following characteristics: surface measure 40.3 g/m$^2$, strength MD 215 N/m; strength CD 75 N/m; with an elongation rate at rupture of 16%.

Ten measurements were made with the product. The mean relative deviations measured were 0.15%. This allows the conclusion that the difference in length measured between two products, one exhibiting a quilted effect and the other not, is significant.

The invention claimed is:

1. A sheet of paper comprising at least two plies of creped tissue paper having creping lines in a range of from 40 to 80 lines per cm and a degree of elongation at rupture no lower than 20%, said at least two plies of creped tissue paper including an upper ply and a lower ply, each ply having a surface measure ranging from 10 to 40 g/m$^2$, wherein the upper ply is embossed and has first protuberances which are positioned as rows which form cells covering an area ranging from 1 to 20 cm$^2$, the upper ply is longer in a direction of advance than the lower ply by at least 0.6%, and the upper ply is connected to the lower ply by an apex or apexes of the first protuberances so that cushions are formed inside the cells, wherein a distance between two adjacent protuberances along a row is no greater than 3 mm.

2. The sheet of paper as claimed in claim 1, wherein the cells have a length/width ratio ranging from 1 to 5.

3. The sheet of paper as claimed in claim 1, wherein the protuberances are truncated in shape, and each protuberance has a base with a diameter ranging from 1 to 3 mm.

4. The sheet of paper as claimed in claim 1, wherein the rows are arranged in two different directions to form the cells.

5. The sheet of paper as claimed in claim 1, wherein the sheet is in a form of a roll.

6. A process for manufacturing the sheet as claimed in claim 1, 2, 3, 4 or 5 comprising unrolling an upper ply of tissue paper from a master spool, embossing the upper ply of tissue paper on an embossing cylinder in said rows which define said closed cells, unrolling a lower ply of tissue paper from a master spool, applying the lower ply to the upper ply and joining the upper ply and the lower ply by apexes of the first protuberances to said upper ply to provide a double strip, the upper ply and the lower ply being differentiated at time of joining the upper ply and the lower ply such that, at rest, length of the upper ply and the lower ply differs by at least 0.6%, rolling up the double strip under tension to provide a roll, and dividing said roll into smaller sections.

7. The process as claimed in claim 6, wherein the upper ply and the lower ply are differentiated from each other based on one or more of unrolling rate, tension in direction of advance, embossing depth, and elasticity.

8. The process as claimed in claim 6, wherein the upper ply and the lower ply are joined by application of adhesive to the apexes of the first protuberances.

9. The process as claimed in claim 6, wherein the upper ply and the lower ply are joined by application of mechanical pressure to the apexes of the first protuberances.

* * * * *